W. B. TREADWELL.
Magazine Stove.
No. 42,610.
2 Sheets—Sheet 1.
Patented May 3, 1864.
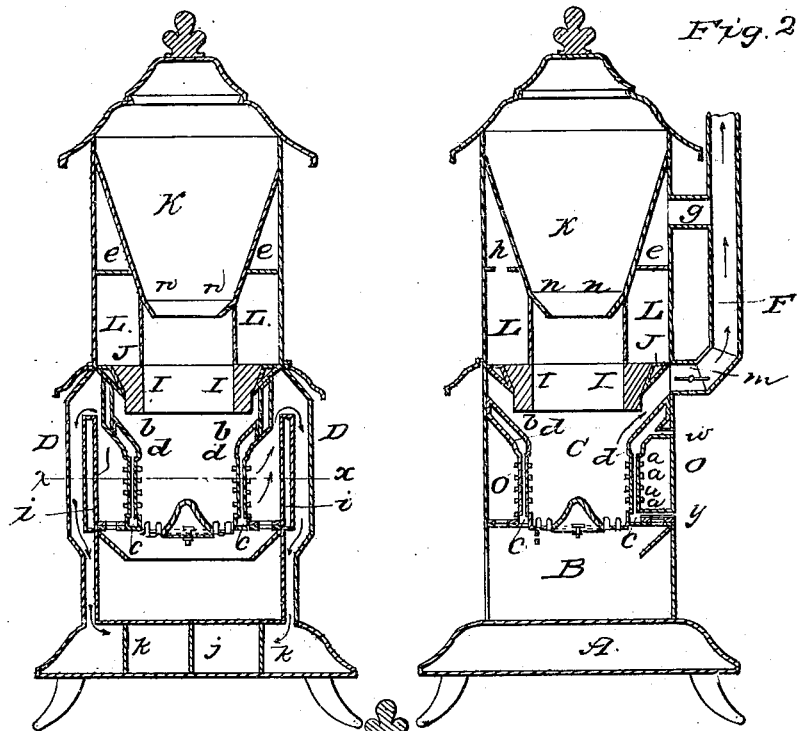
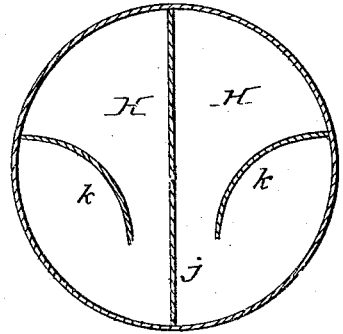
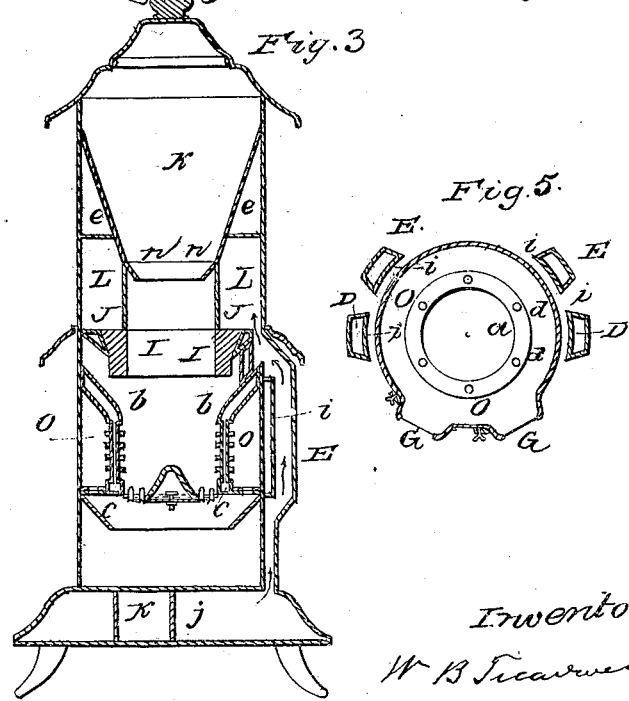
Witnesses
Frank A. Treadwell,
Elizabeth Treadwell.
Inventor
W. B. Treadwell W. B. TREADWELL.
Magazine Stove.
No. 42,610.
2 Sheets—Sheet 2.
Patented May 3, 1864.
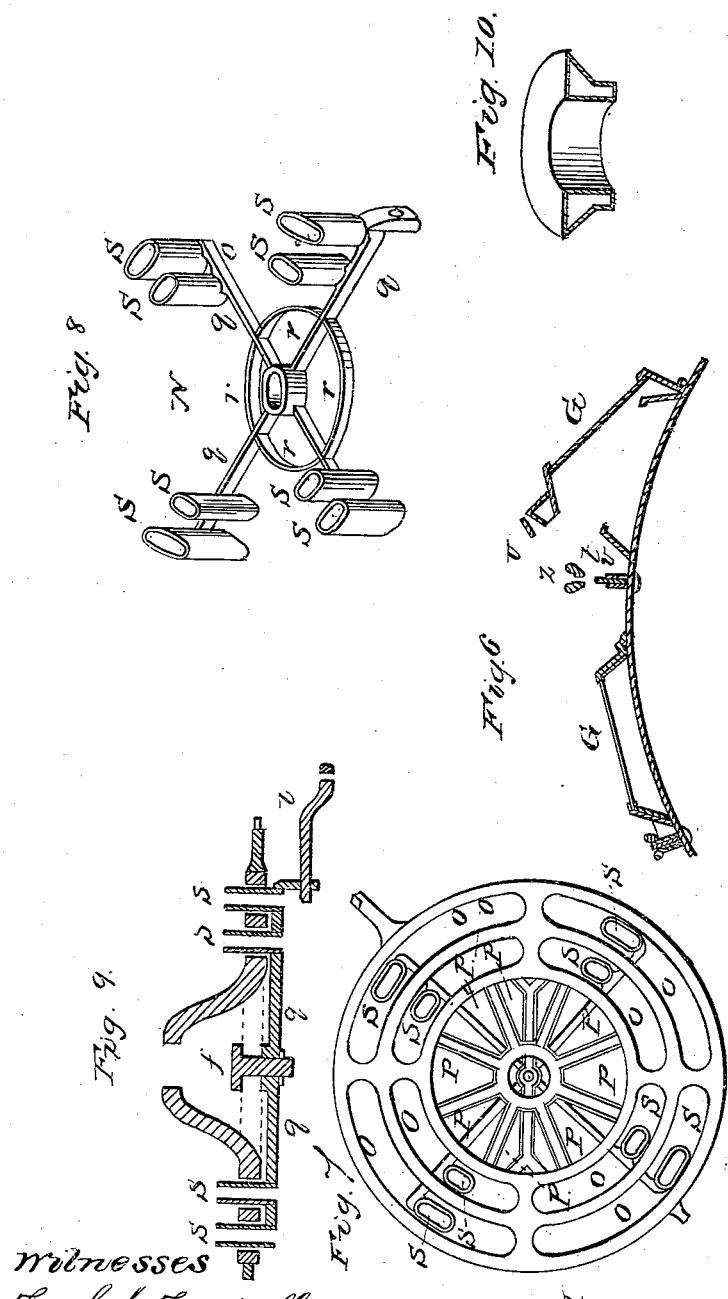
Witnesses
Frank A. Treadwell
Elisabeth Treadwell
Inventor
W B Treadwell

UNITED STATES PATENT OFFICE.

W. B. TREADWELL, OF ALBANY, NEW YORK.

IMPROVEMENT IN COAL-STOVES.

Specification forming part of Letters Patent No. 42,610, dated May 3, 1864.

*To all whom it may concern:*

Be it known that I, W. B. TREADWELL, of the city of Albany, State of New York, have invented certain new and useful Improvements in Base-Burning Stoves; and I do hereby declare that the following is a true and exact description of the same, reference being had to the accompanying drawings, and to the letters of reference marked thereon.

In the drawings, which make part of this specification, Figures 1 and 2 represent vertical sections through planes at right angles to each other. Fig. 3 is a vertical section through the stove, dividing vertically one of the ascending flues, E. Fig. 4 is a horizontal cross-section through chambers H in the base of the stove A. Fig. 5 is a horizontal section through the stove at line $x$ $x$. (See Fig. 1.) Fig. 6 is a longitudinal horizontal section of mica frame G. Fig. 7 is a surface view of grate M and vibrating rake N joined together. Fig. 8 is a perspective view of vibrating rake N. Fig. 9 is a vertical cross-section through the center of the grate and rake joined together. Fig. 10 is a perspective view of half of ring J and fire-brick I combined in one—a hollow cast-iron water-tight ring.

A, drawings, Figs. 1, 2, and 4, is the base of the stove, within which are formed chambers or flues H, divided by a partition-plate, $j$, running through the center from the front to the back of the stove, as shown in drawings, Fig. 4.

B is the ash-pit section, upon which is formed the bed-piece, which supports the grate.

M is the grate, upon which the coals will lie, at the bottom of the fire-pot. It will have a dome or cone shaped center, with grated openings $p$, drawings, Fig. 7. Through the surface of said grate, outside of the dome-center, openings $o$ are formed lengthwise of the circle. It is designed to have the grate lie firmly in its bed, yet it may be constructed to tilt or to be upturned at pleasure. To said grate, by means of a central bolt, $f$, a vibrating rake, N, drawings, Figs. 7, 8, and 9, is attached. The rake is formed of cross bars $q$ and braces $r$, drawings, Fig. 8, to which are attached prongs $s$ (solid or hollow) to pass upward through the openings in the grate and above it one inch, more or less—the number of prongs upon the rake to correspond with the number of openings through the surface of the grate. To remove ashes or any refuse matter which may collect upon the top of the grate the rake may be vibrated at pleasure by means of a lever, $l$, drawings, Figs. 7, 8, and 9.

C is the fire-pot, of annular or elliptical shape, the sides to be formed of horizontal rings $a$, to be bolted together and connected with a brim, $b$, extending from the upper edge of the fire-pot to the outer casing of the stove. The horizontal base-ring $c$ and the brim $b$ of the fire-pot to be made hollow, and connected by tubes $d$, which tubes will pass through the single horizontal rings $a$, through which base, tubes, and brim water may flow. The fire-pot will connect with a tank or reservoir of cold water at inlet $y$, outlet $w$, drawings, Fig. 2.

By one or two mica doors, G, I open into the cavity O in front, which may be thrown open for the purpose of checking combustion. (See drawings, Fig. 5.)

D are descending flues, drawings, Figs. 1 and 5, at the sides of the stove starting from underneath the brim $b$ of the fire-pot, and passing ash-pit, section B, they discharge into chambers H, formed in the base of the stove A, as shown in drawings, Figs. 1 and 4.

E are ascending flues, situated just behind flues D. (See drawings, Figs. 3 and 5.)

There will be a cavity, $i$, between the inner plates of flues D and E and that portion of the outer casing of the stove which surrounds the fire-pot, through which cavities cold air may circulate.

J, drawings, Figs. 1 and 2, is a hollow cast-iron water-tight ring, which when placed in the stove will fill the cavity back of the fire-brick. It will be formed so as to give a bearing to the brick, and it will have cavities back of it through which the products of combustion will pass from ascending flues E upward.

I, drawings, Figs. 1 and 2, is a funnel-ring, of fire-brick, in one or more pieces, which when placed in the stove will lie upon the beveled bearing of ring J.

K, drawings, Figs. 1 and 2, is the feed-cylinder, best made of cast-iron, in two or more horizontal sections. The lower section, made in the form of a follower, at its base will have its principal bearing upon the top of ring J.

$n$, drawings, Figs. 1 and 2, is a cast iron ring, to be placed within the feed-cylinder. It will be formed on an angle, so that coals may pass easily over it—its office being to prevent too great pressure of fuel upon the ignited coals.

L is a flue, which surrounds the feed-cylinder. It will be divided horizontally by ring $e$ and divided vertically in front by a triangularly-shaped plate, $h$, drawings, Fig. 2, running nearly to the top of the feed-cylinder. There will be an opening through ring $e$, divided by the vertical plate $h$ in front, through which the products of combustion will pass upward.

G, drawings, Figs. 5 and 6, is a mica frame of annular or elliptical shape, the base-ring of which is formed on the outer casing of the stove with a bearing for the mica on the outer edge of it. The door (a counterpart covering to the base-ring) to be hung on the one side by a hinge or held in position by a rabbet and fastened on the other (opposite) side by a hollow cap, $v$. Through the outer casing, at the point covered by the hollow cap $v$, drawings, Fig. 6, a screw, $t$, will pass from within outward. A tube-nut, $u$, will hold the screw $t$ in position. Cap $v$ will cover the nut $w$, while the screw will pass through the top of the cap. Nut $z$ upon the screw will hold the mica upon its bearings.

When desirable, I will combine hollow cast-iron ring J and the fire-brick I in one piece—a hollow cast-iron water-tight ring—as shown in drawings, Fig. 10.

Tubes or hollow-arched bearings will connect the fire-pot C at the brim with ring J, and they will be made to support said ring J in position. When so connected, outlet $w$ will be placed upon ring J, instead of upon the brim of the fire-pot. The hollow arched bearings are perforated, and show that cold air may circulate within instead of water.

I will form a direct outlet from the fire-pot through valve $m$ into flue F behind.

As thus constructed, the products of combustion will pass through the openings in the sides of the fire-pot into cavity O, surrounding it, thence into descending flue D from underneath brim $b$. Passing ash-pit, section B, they will descend into chambers H in the base of the stove A. Here, divided by partition-plates $k\ k$, they will be carried nearly to the front of the stove, thence back and into ascending flue E, drawings, Figs. 3 and 5, situated just behind flue D, which flue E will lead them back of ring J into flue L, surrounding the feed-cylinder, thence in flue L forward and upward through the openings in ring $e$, thence backward and off behind through valve $g$, drawings, Fig. 2, into flue F behind.

Having thus fully described the construction and operation of my invention, what I claim as new, and desire to secure by Letters Patent, is—

1. The fire-pot C, constructed substantially as described, to operate in the manner set forth. (See drawings, Figs. 1 and 5.)

2. Ring $n$, within feed cylinder K, drawings, Figs. 1, 2, and 3, as described, for the purpose set forth.

W. B. TREADWELL.

Witnesses:
F. A. TREADWELL,
ELIZABETH TREADWELL.